US008069317B2

(12) United States Patent
Boyd et al.

(10) Patent No.: US 8,069,317 B2
(45) Date of Patent: *Nov. 29, 2011

(54) PROVIDING AND UTILIZING HIGH PERFORMANCE BLOCK STORAGE METADATA

(75) Inventors: Kenneth Wayne Boyd, Tucson, AZ (US); Jeffrey William Palm, Rochester, MN (US); George Oliver Penokie, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 689 days.

This patent is subject to a terminal disclaimer.

(21) Appl. No.: 11/871,532

(22) Filed: Oct. 12, 2007

(65) Prior Publication Data

US 2009/0100212 A1  Apr. 16, 2009

(51) Int. Cl.
*G06F 12/00* (2006.01)
(52) U.S. Cl. ........ 711/156; 711/154; 714/753; 714/755; 714/756; 714/758; 713/194
(58) Field of Classification Search .................. 711/154, 711/156; 714/753, 758, 755–756; 713/194
See application file for complete search history.

(56) References Cited

U.S. PATENT DOCUMENTS

| 5,200,864 | A | 4/1993 | Dunn et al. |
| 5,301,304 | A | 4/1994 | Menon |
| 5,951,691 | A | 9/1999 | Ng et al. |
| 6,297,891 | B1 | 10/2001 | Kara |
| 6,438,646 | B1 | 8/2002 | Kitamura et al. |
| 6,748,486 | B2 | 6/2004 | Burton et al. |
| 6,775,693 | B1 | 8/2004 | Adams |
| 6,874,092 | B1* | 3/2005 | Motoyama et al. ........... 713/300 |
| 7,310,316 | B2 | 12/2007 | Auerbach |
| 2002/0162014 | A1* | 10/2002 | Przydatek et al. ............ 713/200 |
| 2003/0023933 | A1 | 1/2003 | Duncan |
| 2005/0076226 | A1* | 4/2005 | Boivie et al. .................. 713/187 |
| 2006/0129901 | A1 | 6/2006 | Arataki et al. |
| 2006/0206680 | A1 | 9/2006 | Yamanaka et al. |
| 2007/0050542 | A1 | 3/2007 | Benhase et al. |
| 2008/0024835 | A1* | 1/2008 | Harano ......................... 358/474 |
| 2009/0259456 | A1* | 10/2009 | Amann et al. .................. 703/23 |

(Continued)

OTHER PUBLICATIONS

Gerald Houlder, "Data Integrity Proposal", Document T10/03-110r0, T10 technical committee of the InterNational Committee for Information Technology Standards (INCITS), Mar. 7, 2003. (http://www.t10.org/ftp/t10/document.03/03-110r0.pdf).

(Continued)

*Primary Examiner* — Kevin L Ellis
*Assistant Examiner* — Matthew Bradley
(74) *Attorney, Agent, or Firm* — Matthew J. Bussan

(57) ABSTRACT

An enhanced mechanism for the allocation, organization and utilization of high performance block storage metadata provides a stream of data (e.g., in a server system, storage system, DASD, etc.) that includes a sequence of fixed-size blocks which together define a page. Each of the fixed-size blocks includes a data block and a footer. A high performance block storage metadata unit associated with the page is created from a confluence of the footers. Each footer in the confluence of footers has space available for application metadata, which are provided as one or more information units. At least one of the footers includes a Checksum field containing a checksum that covers at least the confluence of footers. This approach is advantageous in that it provides data integrity protection, protects against stale data, and significantly increases the amount of metadata space available for application use.

24 Claims, 12 Drawing Sheets

U.S. PATENT DOCUMENTS

2009/0259924 A1 10/2009 Amann et al.

OTHER PUBLICATIONS

Gerald Houlder, "End to End Data Protection", Document T10/03-110r1, T10 technical committee of the InterNational Committee for Information Technology Standards (INCITS), May 7, 2003. (http://www.t10.org/ftp/t10/document.03/03-110r1.pdf).

Gerald Houlder, Document T10/03-111r0, T10 technical committee of the InterNational Committee for Information Technology Standards (INCITS), 2003. (http://www.t10.org/ftp/t10/document.03/03-111r0.pdf).

George Penokie, "End-to-End Data Protection", Document T10/03-176r0, T10 technical committee of the InterNational Committee for Information Technology Standards (INCITS), May 1, 2003. (http://www.t10.org/ftp/t10/document.03/03-176r0.pdf).

Keith Holt, "End-to-End Data Protection Justification", Document T10/03-224r0, T10 technical committee of the InterNational Committee for Information Technology Standards (INCITS), Jul. 1, 2003. (http://www.t10.org/ftp/t10/document.03/03-224r0.pdf).

David Broom et al., "Protecting Oracle Data Integrity: Hitachi Database Validator Technology and the Hitachi Freedom Storage Lightning 9900 V Series Systems", Technical White Paper, Hitachi Data Systems, Jan. 2003. (http://www.hds.com/assets/pdf/wp127_01_dbvalidator.pdf).

Narayan Ayalasomayajula et al., "DIF (Data Integrity Field): Provides End-to-End Protection of User Data", White Paper, Agilent Technologies, Aug. 31, 2004. (http://cp.literature.agilent.com/litweb/pdf/5989-0892EN.pdf).

J. Brown et al., "Oracle's Hardware Assisted Resilient Data (H.A.R.D.)", Nov. 16, 2001. (http://www.oracle.com/technology/deploy/availability/htdocs/hard_metalink_note_158367.pdf).

"Emulex, LSI, Oracle and Seagate Collaborate to Reduce System Downtime with Groundbreaking Data Integrity Initiative", Press Release, Emulex Corporation, Apr. 18, 2007. (http://www.emulex.com/press/2007/0418-01.jsp).

U.S. Appl. No. 12/100,237, to Amann et al., entitled "Data Protection for Variable Length Records by Utilizing High Performance Block Storage Metadata", filed Apr. 9, 2008, assigned to International Business Machines Corporation.

U.S. Appl. No. 12/100,249, to Amann et al., entitled "Data Protection Method for Variable Length Records by Utilizing High Performance Block Storage Metadata", filed Apr. 9, 2008, assigned to International Business Machines Corporation.

* cited by examiner

- Subtype = "Erase on Date" (1 Byte) — 1210
- Length (1 Byte) — 1220
- Data (17 Bytes) — 1230
  - Erase Date (8 Bytes) — 1232
  - Erase Status (1 Byte) — 1234
  - Date Erase Completed (8 Bytes) — 1236

- Subtype = "Secure Erase" (1 Byte) — 1310
- Length (1 Byte) — 1320
- Data (18 Bytes) — 1330
  - Erase Date (8 Bytes) — 1332
  - Erase Status (1 Byte) — 1334
  - Date Erase Completed (8 Bytes) — 1336
  - Secure Erase Type (1 Byte) — 1338

PROVIDING AND UTILIZING HIGH
PERFORMANCE BLOCK STORAGE
METADATA

BACKGROUND OF THE INVENTION

1. Field of Invention

The present invention relates in general to the digital data processing field and, in particular, to block data storage (i.e., data storage organized and accessed via blocks of fixed size). More particularly, the present invention relates to a mechanism for the allocation, organization and utilization of high performance block storage metadata.

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multiprocessor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

The overall value or worth of a computer system depends largely upon how well the computer system stores, manipulates and analyzes data. When a computer system performs these operations, data are typically organized and accessed via blocks of fixed size. For many types of data streams, the terminology "block" is applied to chunks of the data stream having various fixed sizes. The typical formatting of a magnetic disk (e.g., a hard disk, floppy diskette, etc), for example, provides a block size of 512 bytes (e.g., hard disks, floppy diskettes, etc).

FIG. 1 is a schematic diagram illustrating an example data structure for a conventional sequence 100 (referred to as a "page") of fixed-size blocks 102 (e.g., 512 bytes). Typically, for performance reasons no metadata is associated with any particular one of the blocks 102 or the page 100 unless such metadata is written within the blocks 102 by an application. Metadata is information describing, or instructions regarding, the associated data blocks. Although there has been recognition in the digital data processing field of the need for high performance block storage metadata to enable new applications, such as data integrity protection, attempts to address this need have met with limited success. Two notable attempts to address this need for high performance block storage metadata are Oracle's Hardware Assisted Resilient Data (HARD) architecture and the T10 End-to-End Data Protection architecture.

The T10 End-to-End (ETE) Data Protection architecture is described in various documents of the T10 technical committee of the InterNational Committee for Information Technology Standards (INCITS), such as T10/03-110r0, T10/03-111r0 and T10/03-176r0. As discussed in more detail below, two important drawbacks of the current T10 ETE Data Protection architecture are: 1) no protection is provided against "stale data"; and 2) very limited space is provided for metadata.

FIG. 2 is a schematic diagram illustrating an example data structure for a conventional sequence 200 (referred to as a "page") of fixed-size blocks 202 in accordance with the current T10 ETE Data Protection architecture. Each fixed-size block 202 includes a data block 210 (e.g., 512 bytes) and a T10 footer 212 (8 bytes). Each T10 footer 212 consists of three fields, i.e., a Ref Tag field 220 (4 bytes), a Meta Tag field 222 (2 bytes), and a Guard field 224 (2 bytes). The Ref Tag field 220 is a four byte value that holds information identifying within some context the particular data block 210 with which that particular Ref Tag field 220 is associated. Typically, the first transmitted Ref Tag field 220 contains the least significant four bytes of the logical block address (LBA) field of the command associated with the data being transmitted. During a multi-block operation, each subsequent Ref Tag field 220 is incremented by one. The Meta Tag field 222 is a two byte value that is typically held fixed within the context of a single command. The Meta Tag field 222 is generally only meaningful to an application. For example, the Meta Tag field 222 may be a value indicating a logical unit number in a Redundant Array of Inexpensive/Independent Disks (RAID) system. The Guard field 224 is a two byte value computed using the data block 210 with which that particular Guard field 224 is associated. Typically, the Guard field 224 contains the cyclic redundancy check (CRC) of the contents of the data block 210 or, alternatively, may be checksum-based.

It is important to note that under the current T10 ETE Data Protection architecture, metadata is associated with a particular data block 202 but not the page 200. The T10 metadata that is provided under this approach has limited usefulness. The important drawbacks of the current T10 ETE Data Protection architecture mentioned above (i.e., no protection against "stale data", and very limited space for metadata) find their origin in the limited usefulness of the metadata that is provided under this scheme. First, the current T10 approach allows only 2 bytes (i.e., counting only the Meta Tag field 222) or, at best, a maximum of 6 bytes (i.e., counting both the Ref Tag field 220 and the Meta Tag field 222) for general purpose metadata space, which is not sufficient for general purposes. Second, the current T10 approach does not protect against a form of data corruption known as "stale data", which is the previous data in a block after data written over that block was lost, e.g., in transit, from write cache, etc. Since the T10 metadata is within the footer 212, stale data appears valid and is therefore undetectable as corrupted.

To address the latter one of these drawbacks (i.e., very limited space for metadata), it is known to include an Unguarded Data Field (UDF) (e.g., 4, 8, 12, . . . , 32 bytes) between the data block 210 and the T10 footer 212. Such a UDF is a multiple byte (e.g., four byte multiples) value that indicates identification information. For example, the UDF may be a software stamp to indicate creator, data type, creation and/or last modification data, data path, or other identification information. See, for example, document T10/03-110r1 or of the T10 technical committee of the INCITS. Again, it is important to note that under this enhanced-version of the current ETE Data Protection architecture, metadata is associated with a particular data block 202 but not the page 200. Moreover, the metadata that is provided under this enhanced scheme does not address the other drawback, i.e., no protection is provided against "stale data".

Oracle's Hardware Assisted Resilient Data (HARD) architecture is a proprietary architecture the sole purpose of which is to protect Oracle databases from undetected data corruption. Two important drawbacks of Oracle's HARD architecture are: 1) it is proprietary; and 2) as discussed in more detail below, it is limited to only Oracle database applications.

Oracle's HARD architecture is applicable only to Oracle database applications. The HARD architecture does not provide a general purpose architecture for block storage metadata and cannot be used for applications beyond protecting Oracle databases. The HARD architecture is implemented in the server at the application level, where protection metadata is contained within standard blocks, not block extensions. An Oracle database application has functionality to add check data to each data block when issuing write requests. This check data is examined and validated at each read operation of the Oracle database application. To prevent corrupted data blocks generated in the database-to-storage system infrastructure from being written onto the storage disk, it is known to integrate Oracle's data integrity checksum algorithms at the microchip and microcode level into storage systems, such as the Hitachi Freedom Storage Lightning 9900 V Series System. This provides additional verification of the Oracle check data on the storage system side. See, for example, David Broom and Rasha Hasaneen, Technical White Paper entitled "Protecting Oracle Data Integrity: Hitachi Database Validator Technology and the Hitachi Freedom Storage Lightning 9900 V Series Systems", Hitachi Data Systems, January, 2003. {www.hds.com/assets/pdf/wp127_01_db-validator.pdf}. Nonetheless, even when Oracle's HARD architecture is enhanced by integrating Oracle's data integrity checksum algorithms into storage systems, the HARD architecture is still only applicable only to Oracle database applications.

Therefore, a need exists for an enhanced mechanism for the allocation, organization and utilization of high performance block storage metadata.

SUMMARY OF THE INVENTION

According to one aspect of the present invention, an enhanced mechanism for the allocation, organization and utilization of high performance block storage metadata provides a stream of data (e.g., in a server system, in a storage system, in a DASD, etc.) that includes a sequence of fixed-size blocks which together define a page. Each of the fixed-size blocks includes a data block and a footer. A high performance block storage metadata unit associated with the page is created from a confluence of the footers. Each footer in the confluence of footers includes a Tag field and has space available for application metadata. The application metadata are provided as one or more information units. Each information unit may include, for example, a subtype field, a length field, and a data field. A Type field is included in at least one of the footers, as is a Checksum field containing a checksum (i.e., calculated using any suitable hash function, including a CRC) that covers at least the confluence of footers. This approach is advantageous in that it provides data integrity protection, protects against stale data, and significantly increases the amount of metadata space available for application use.

According to another aspect of the present invention, an enhanced mechanism for the utilization of high performance block storage metadata compares a current data with an erase data contained in a metadata unit. A sequence of fixed-size blocks defines a page, wherein each fixed-size block includes a data block and a footer. The metadata unit is created from a confluence of the footers and associated with the page. At least a portion of the page is erased if the erase date is on or before the current date. In one embodiment, the data is erased with a simple overwrite. In another embodiment, the data is erased using a selectable type of secure erase that ensures the erased information cannot possibly be recovered. Preferably, an erase confirmation (e.g., an "erase status" value and/or an "erase completed date" value) is written into the metadata unit upon successful completion of the erase step. This approach is useful in applications such as security and data life cycle management.

The foregoing and other features and advantages of the invention will be apparent from the following more particular description of the preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

FIG. 12 is a schematic diagram illustrating an example data structure for an information unit for use with an "erase on date" application in accordance with the preferred embodiments of the present invention.

FIG. 13 is a block diagram illustrating an example data structure for an information unit for use with a "secure erase" application in accordance with the preferred embodiments of the present invention.

DETAILED DESCRIPTION OF THE PREFERRED EMBODIMENTS 1.0 Overview

In accordance with one aspect of the present invention, an enhanced mechanism for the allocation, organization and utilization of high performance block storage metadata provides a stream of data (e.g., in a server system, in a storage system, in a DASD, etc.) that includes a sequence of fixed-size blocks which together define a page. Each of the fixed-size blocks includes a data block and a footer. A high performance block storage metadata unit associated with the page is created from a confluence of the footers. Each footer in the confluence of footers includes a Tag field and has space available for application metadata. The application metadata are provided as one or more information units. Each information unit may include, for example, a subtype field, a length field, and a data field. A Type field is included in at least one of the footers, as is a Checksum field containing a checksum (i.e., calculated utilizing any suitable hash function, including a CRC) that covers at least the confluence of footers. This approach is advantageous in that it provides data integrity protection, protects against stale data, and significantly increases the amount of metadata space available for application use.

In accordance with another aspect of the present invention, an enhanced mechanism for the utilization of high performance block storage metadata compares a current data with an erase data contained in a metadata unit. A sequence of fixed-size blocks defines a page, wherein each fixed-size block includes a data block and a footer. The metadata unit is created from a confluence of the footers and associated with the page. At least a portion of the page is erased if the erase date is on or before the current date. In one embodiment, the data is erased with a simple overwrite. In another embodiment, the data is erased using a selectable type of secure erase that ensures the erased information cannot possibly be recovered. Preferably, an erase confirmation (e.g., an "erase status" value and/or an "erase completed date" value) is written into the metadata unit upon successful completion of the erase step. This approach is useful in applications such as security and data life cycle management.

2.0 Detailed Description

Figure 1:
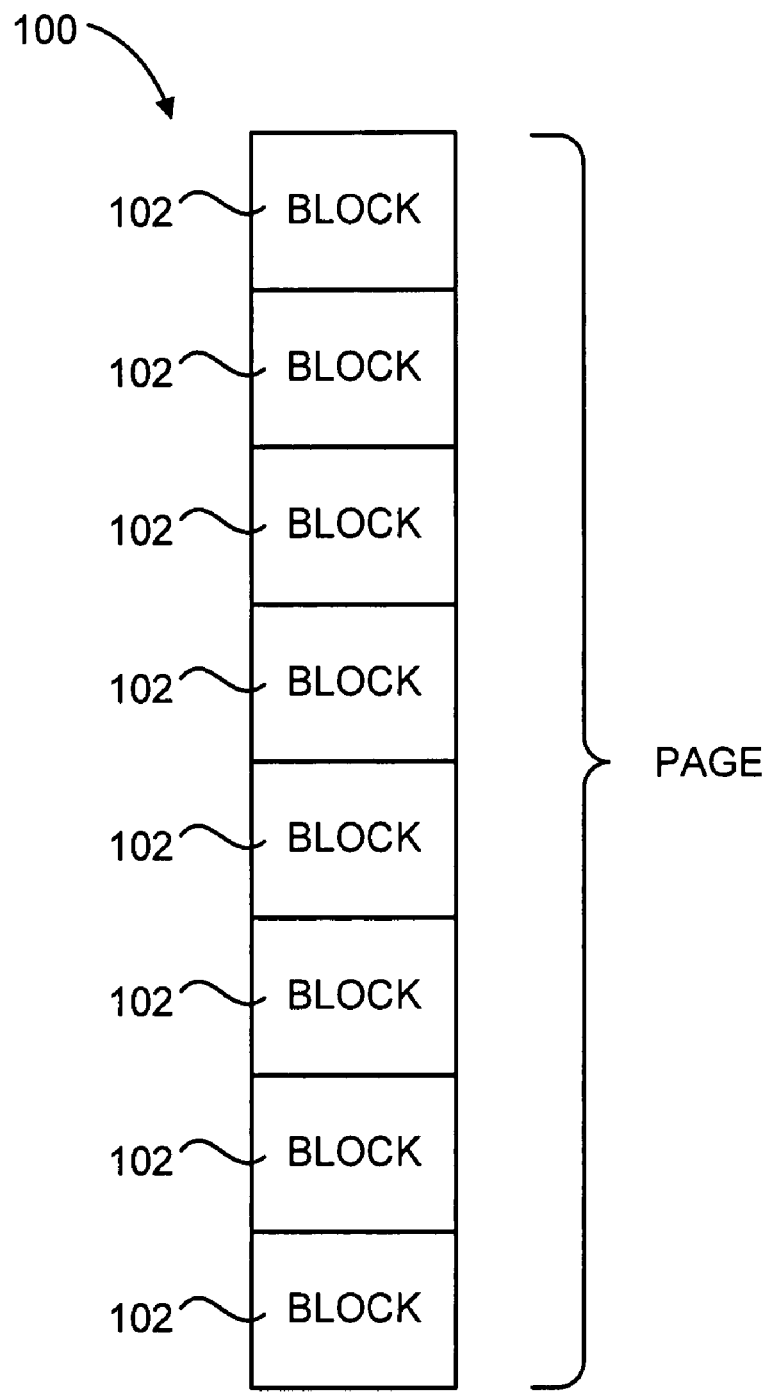
FIG. 1 is a schematic diagram illustrating an example data structure for a conventional sequence of fixed-size blocks that together define a page.
Figure 2:
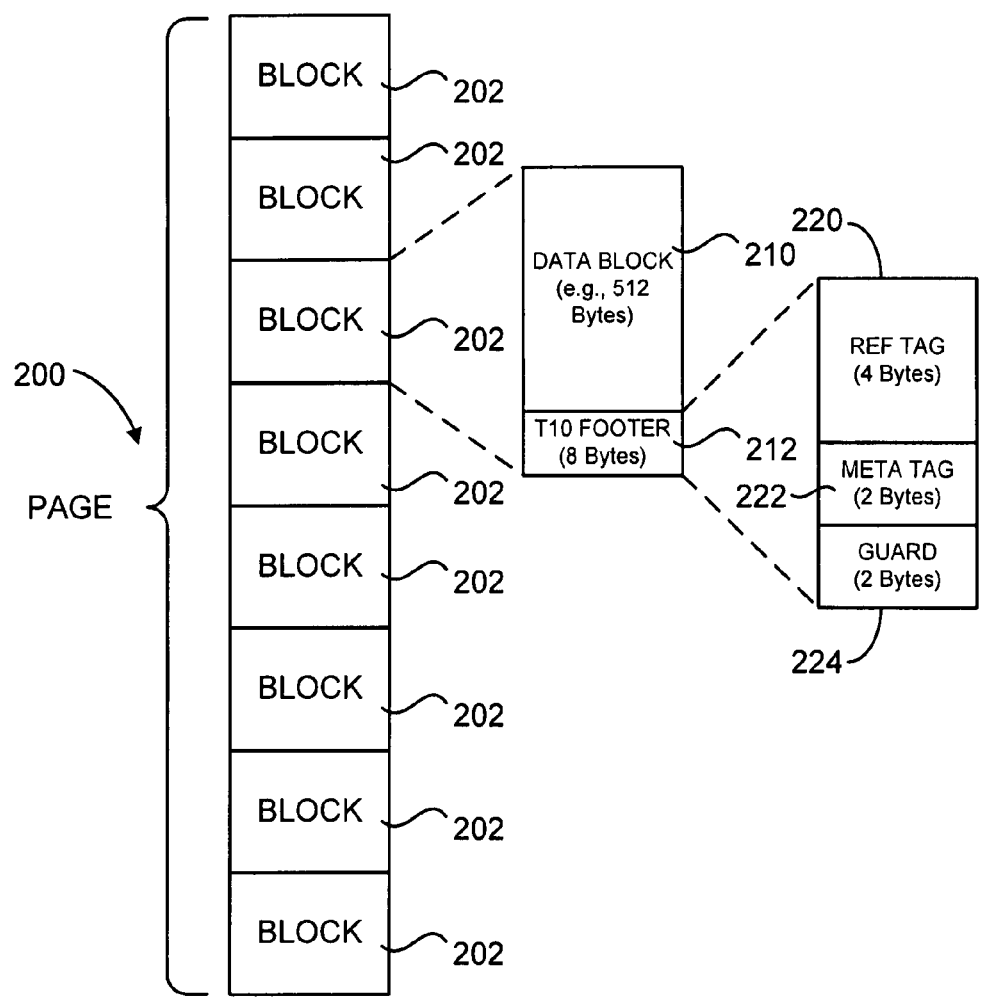
FIG. 2 is a schematic diagram illustrating an example data structure for a conventional sequence (i.e., page) of fixed-size blocks in accordance with the current T10 End-to-End (ETE) Data Protection architecture.
Figure 3:
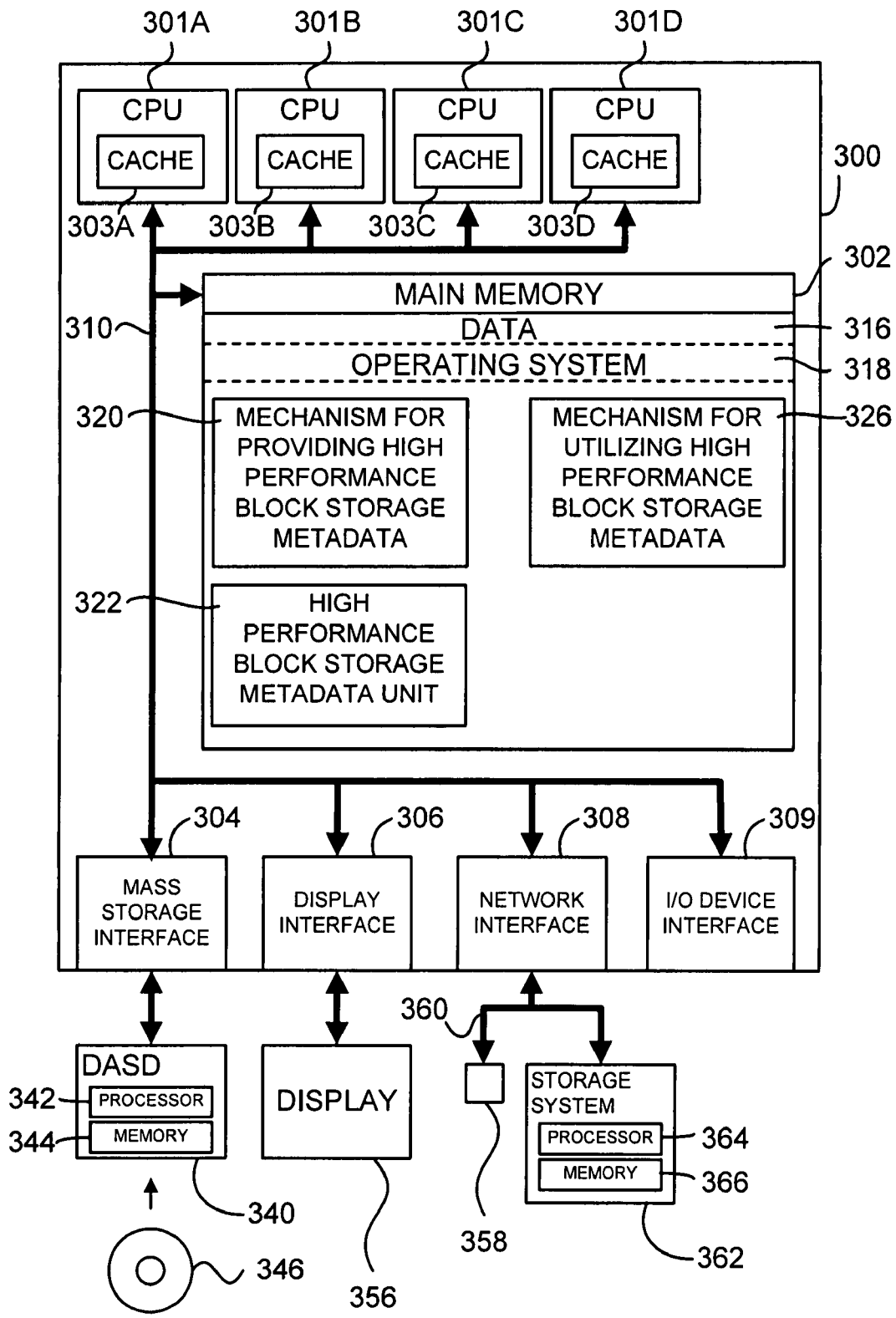
FIG. 3 is a schematic diagram of a computer apparatus for providing high performance block storage metadata in accordance with the preferred embodiments of the present invention.

A computer system implementation of the preferred embodiments of the present invention will now be described with reference to FIG. 3 in the context of a particular computer system 300, i.e., an IBM eServer iSeries or System i computer system. However, those skilled in the art will appreciate that the method, apparatus, computer program product, and data structure of the present invention apply equally to any computer system, regardless of whether the computer system is a complicated multi-user computing apparatus, a single user workstation, a PC, a DASD (such as an "intelligent" hard disk drive), a storage system (such as an "intelligent" external storage system) or an embedded control system. As shown in FIG. 3, computer system 300 comprises one or more processors 301A, 301B, 301C and 301D, a main memory 302, a mass storage interface 304, a display interface 306, a network interface 308, and an I/O device interface 309. These system components are interconnected through the use of a system bus 310.

FIG. 3 is intended to depict the representative major components of computer system 300 at a high level, it being understood that individual components may have greater complexity than represented in FIG. 3, and that the number, type and configuration of such components may vary. For example, computer system 300 may contain a different number of processors than shown.

Processors 301A, 301B, 301C and 301D (also collectively referred to herein as "processors 301") process instructions and data from main memory 302. Processors 301 temporarily hold instructions and data in a cache structure for more rapid access. In the embodiment shown in FIG. 3, the cache structure comprises caches 303A, 303B, 303C and 303D (also collectively referred to herein as "caches 303") each associated with a respective one of processors 301A, 301B, 301C and 301D. For example, each of the caches 303 may include a separate internal level one instruction cache (L1 I-cache) and level one data cache (L1 D-cache), and level two cache (L2 cache) closely coupled to a respective one of processors 301. However, it should be understood that the cache structure may be different; that the number of levels and division of function in the cache may vary; and that the system might in fact have no cache at all.

Main memory 302 in accordance with the preferred embodiments contains data 316, an operating system 318 and application software, utilities and other types of software. In addition, in accordance with the preferred embodiments of the present invention, the main memory 302 also includes a mechanism for providing high performance block storage metadata 320, a high performance block storage metadata unit 322, and a mechanism for utilizing high performance block storage metadata 326, each of which may in various embodiments exist in any number. Although the mechanism for providing high performance block storage metadata 320, the high performance block storage metadata unit 322, and the mechanism for utilizing high performance block storage metadata 326 are illustrated as being contained within the main memory 302, in other embodiments some or all of them may be on different electronic devices (e.g., on a direct access storage device 340 and/or on a storage system 362) and may be accessed remotely.

In accordance with the preferred embodiments of the present invention, the mechanism for providing high performance block storage metadata 320 provides one or more high performance block storage metadata units 322 as further described below with reference to FIGS. 4-8 (schematic diagrams illustrating exemplary data structures) and FIG. 9 (a flow diagram illustrating an exemplary method for providing high performance block storage metadata). As described in more detail below, the high performance block storage metadata unit 322 is associated with a page that is defined by a sequence of fixed-size blocks. Each of the fixed-size blocks includes a data block and a footer. The high performance block storage metadata unit 322 is created from a confluence of these footers.

In accordance with the preferred embodiments of the present invention, the mechanism for utilizing high performance block storage metadata 326 utilizes one or more high performance block storage metadata units 322 in applications such as security and data life cycle management as further described below with reference to FIGS. 10 and 11 (flow diagrams illustrating exemplary methods for utilizing high performance block storage metadata) and FIGS. 12 and 13 (schematic diagrams illustrating exemplary data structures). For example, the high performance block storage metadata unit 322 may contain an erase date on which or after which at least a portion of the page (i.e., the page with which the metadata unit 322 is associated) is to be erased.

In the preferred embodiments of the present invention, the providing mechanism 320 and the utilizing mechanism 326 include instructions capable of executing on the processors 301 or statements capable of being interpreted by instructions executing on the processors 301 to perform the functions as further described below with reference to FIGS. 9-11. In another embodiment, either the providing mechanism 320 or the utilizing mechanism 326, or both, may be implemented in hardware via logic gates and/or other appropriate hardware techniques in lieu of, or in addition to, a processor-based system.

While the providing mechanism 320 and the utilizing mechanism 326 are shown separate and discrete from each other in FIG. 3, the preferred embodiments expressly extend to these mechanisms being implemented within a single component. In addition, either the providing mechanism 320 or the utilizing mechanism 326, or both, may be implemented in the operating system 318 or application software, utilities, or other types of software within the scope of the preferred embodiments.

Computer system 300 utilizes well known virtual addressing mechanisms that allow the programs of computer system 300 to behave as if they have access to a large, single storage entity instead of access to multiple, smaller storage entities such as main memory 302 and DASD device 340. Therefore, while data 316, operating system 318, the mechanism for providing high performance block storage metadata 320, the high performance block storage metadata unit 322, and the mechanism for utilizing high performance block storage metadata 326, are shown to reside in main memory 302, those skilled in the art will recognize that these items are not necessarily all completely contained in main memory 302 at the same time. It should also be noted that the term "memory" is used herein to generically refer to the entire virtual memory of the computer system 300.

Data 316 represents any data that serves as input to or output from any program in computer system 300. Operating system 318 is a multitasking operating system known in the industry as OS/400 or IBM i5/OS; however, those skilled in the art will appreciate that the spirit and scope of the present invention is not limited to any one operating system.

Processors 301 may be constructed from one or more microprocessors and/or integrated circuits. Processors 301 execute program instructions stored in main memory 302. Main memory 302 stores programs and data that may be accessed by processors 301. When computer system 300 starts up, processors 301 initially execute the program instructions that make up operating system 318. Operating system 318 is a sophisticated program that manages the resources of computer system 300. Some of these resources are processors 301, main memory 302, mass storage interface 304, display interface 306, network interface 308, I/O device interface 309 and system bus 310.

Although computer system 300 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load compute-intensive processing from processors 301. However, those skilled in the art will appreciate that the present invention applies equally to computer systems that simply use I/O adapters to perform similar functions.

Mass storage interface 304 is used to connect mass storage devices (such as a direct access storage device 340) to computer system 300. The direct access storage device (DASD) 340 may include a processor 342 and a memory 344. One specific type of direct access storage device 340 is hard disk drive (HDD). Another specific type of direct access storage device is a readable and writable CD ROM drive, which may store data to and read data from a CD ROM 346. In accordance with the preferred embodiments of the present invention, the data stored to and read from the DASD 340 (e.g., on the CD ROM 346, a hard disk, or other storage media) includes high performance block storage metadata. In the DASD 340, the footer of a fixed-size block will generally be written on the storage media together with the data block of the fixed-size block. This differs from the memory 302 of the computer system 300, where the footer of a fixed-size block is written in a separate physical area (i.e., the high performance block storage metadata unit 322) than where the data block of the fixed-size block is written.

In accordance with the preferred embodiments of the present invention, in lieu of, or in addition to, storing the providing mechanism 320 and the utilizing mechanism 326 on the main memory 302 of the computer system 300, the memory 344 of the DASD 340 may be used to store the providing mechanism 320 and/or the utilizing mechanism 326. Hence, in the preferred embodiments of the present invention, the providing mechanism 320 and the utilizing mechanism 326 include instructions capable of executing on the processor 342 of the DASD 340 or statements capable of being interpreted by instructions executing on the processor 342 of the DASD 340 to perform the functions as further described below with reference to FIGS. 9-11. For example, the DASD 340 may be an "intelligent" storage device that erases "autonomously" (i.e., without the need for a command from the computer system 300) a portion of a page once an erase date in metadata associated with that page has passed.

More generally, an architecture in accordance with the preferred embodiments of the present invention allows a storage controller (e.g., the storage controller of the DASD 340) to act autonomously (from the computer or system that wrote the page) on the data according to instructions encoded in the metadata space (e.g., the space available for application metadata 550,650, described below).

Display interface 306 is used to directly connect one or more displays 356 to computer system 300. These displays 356, which may be non-intelligent (i.e., dumb) terminals or fully programmable workstations, are used to allow system administrators and users (also referred to herein as "operators") to communicate with computer system 300. Note, however, that while display interface 306 is provided to support communication with one or more displays 356, computer system 300 does not necessarily require a display 356, because all needed interaction with users and processes may occur via network interface 308.

Network interface 308 is used to connect other computer systems and/or workstations 358 and/or storage systems 362 to computer system 300 across a network 360. The present invention applies equally no matter how computer system 300 may be connected to other computer systems and/or workstations and/or storage systems, regardless of whether the network connection 360 is made using present-day analog and/or digital techniques or via some networking mechanism of the future. In addition, many different network protocols can be used to implement a network. These protocols are specialized computer programs that allow computers to communicate across network 360. TCP/IP (Transmission Control Protocol/Internet Protocol) is an example of a suitable network protocol.

The storage system 362 may include a processor 364 and a memory 366, similar to the processor 342 and the memory 344 in the DASD 340. In accordance with the preferred embodiments of the present invention, the data stored to and read from the storage system 362 (e.g., from hard disk drives, tape drives, or other storage media) includes high performance block storage metadata. In the storage system 362, as in the DASD 340, the footer of a fixed-size block will generally be written on the storage media together with the data block of the fixed size block. This differs from the memory 302 of the computer system 300, where the footer of a fixed-size block is written in a separate physical area (i.e., the high performance block storage metadata unit 322) than where the data block of the fixed-size block is written.

In accordance with the preferred embodiments of the present invention, in lieu of, or in addition to, storing the providing mechanism 320 and the utilizing mechanism 326 on the main memory 302 of the computer system 300, the memory 366 of the storage system 362 may be used to store the providing mechanism 320 and/or the utilizing mechanism 326. Hence, in the preferred embodiments of the present invention, the mechanisms 320 and 326 include instructions capable of executing on the processor 364 of the storage system 362 or statements capable of being interpreted by instructions executing on the processor 364 of the storage system 362 to perform the functions as further described below with reference to FIGS. 9-11. For example, the storage system 362 may be an "intelligent" external storage system that erases "autonomously" (i.e., without the need for a command from the computer system 300) a portion of a page once an erase date in metadata associated with that page has passed.

More generally, an architecture in accordance with the preferred embodiments of the present invention allows a storage controller (e.g., the storage controller of the storage system 362) to act autonomously (from the computer or system that wrote the page) on the data according to instructions encoded in the metadata space (e.g., the space available for application metadata 550,650, described below).

The I/O device interface 309 provides an interface to any of various input/output devices.

At this point, it is important to note that while this embodiment of the present invention has been and will be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROMs (e.g., CD ROM 346 of FIG. 3), and transmission type media such as digital and analog communications links (e.g., network 360 in FIG. 3).

Figure 4:
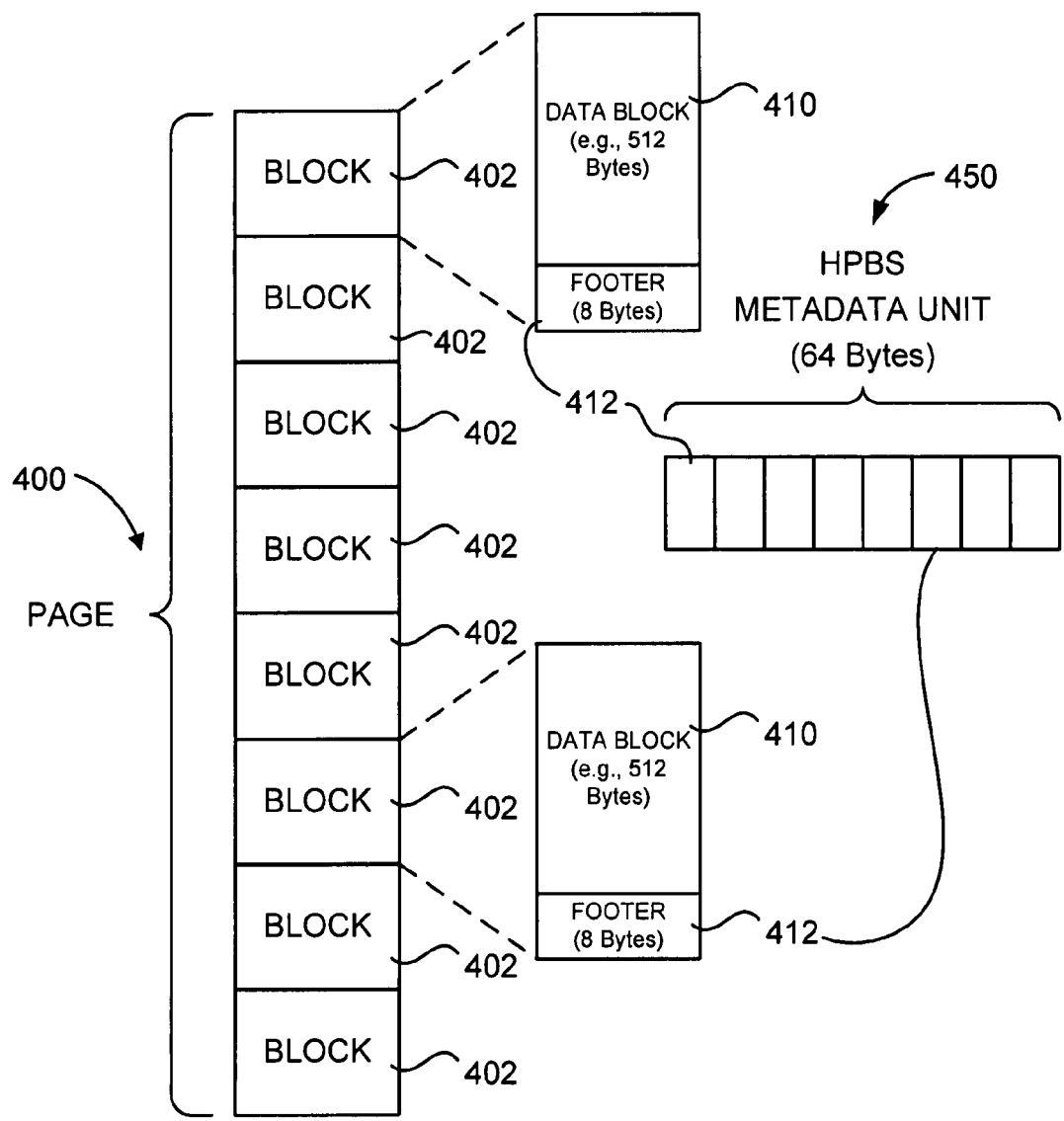
FIG. 4 is a schematic diagram illustrating an example data structure for a sequence (i.e., page) of fixed-size blocks for providing high performance block storage metadata in accordance with the preferred embodiments of the present invention.

FIG. 4 is a schematic diagram illustrating an example data structure for a sequence 400 (also referred to herein as a "page") of fixed-size blocks 402 for providing high performance block storage metadata in accordance with the preferred embodiments of the present invention. Generally, the entire page 400 is read/written together in one operation. Although the page size of the page 400 shown in FIG. 4 is 8 blocks (i.e., 8 fixed-size blocks 402), one skilled in the art will appreciate that a page in accordance with the preferred embodiments of the present invention may have any suitable page size. Preferably, the page size is between 1 to 128 blocks and, more preferably, the page size is 8 blocks. Each fixed-size block 402 includes a data block 410 (e.g., 512 bytes) and a footer 412 (e.g., 8 bytes). Only the data block 410 and the footer 412 of the first and the sixth fixed-size blocks 402 are shown in FIG. 4. Preferably, each of the data blocks 410 is 512 bytes and each of the footers 412 is 8 bytes. However, one skilled in the art will appreciate that the data blocks and the footers in accordance with the preferred embodiments of the present invention may have any suitable size.

As shown in FIG. 4, in accordance with the preferred embodiments of the present invention, a high performance block storage (HPBS) metadata unit 450 is created from a confluence of the footers 412. The HPBS metadata unit 450 in FIG. 4 corresponds with the high performance block storage metadata unit 322 in FIG. 3. While the exemplary HPBS metadata unit 450 shown in FIG. 4 is 64 bytes (i.e., 8 footers× 8-bytes/footer), one skilled in the art will appreciate that the HPBS metadata unit in accordance with the preferred embodiments is not limited to 64 bytes (i.e., the size of the HPBS metadata unit is the product of the number of fixed-size blocks/page and the size of the footer within each of the fixed-size blocks). The sequential order of the footers in the page is retained in the confluence of footers that make up the HPBS metadata unit 450. For example, as shown in FIG. 4, the footers 412 of the first and sixth fixed-size blocks 402 in the page 400 respectively occupy the first and sixth "slots" in the confluence of footers that define the HPBS metadata unit 450.

Figure 5:
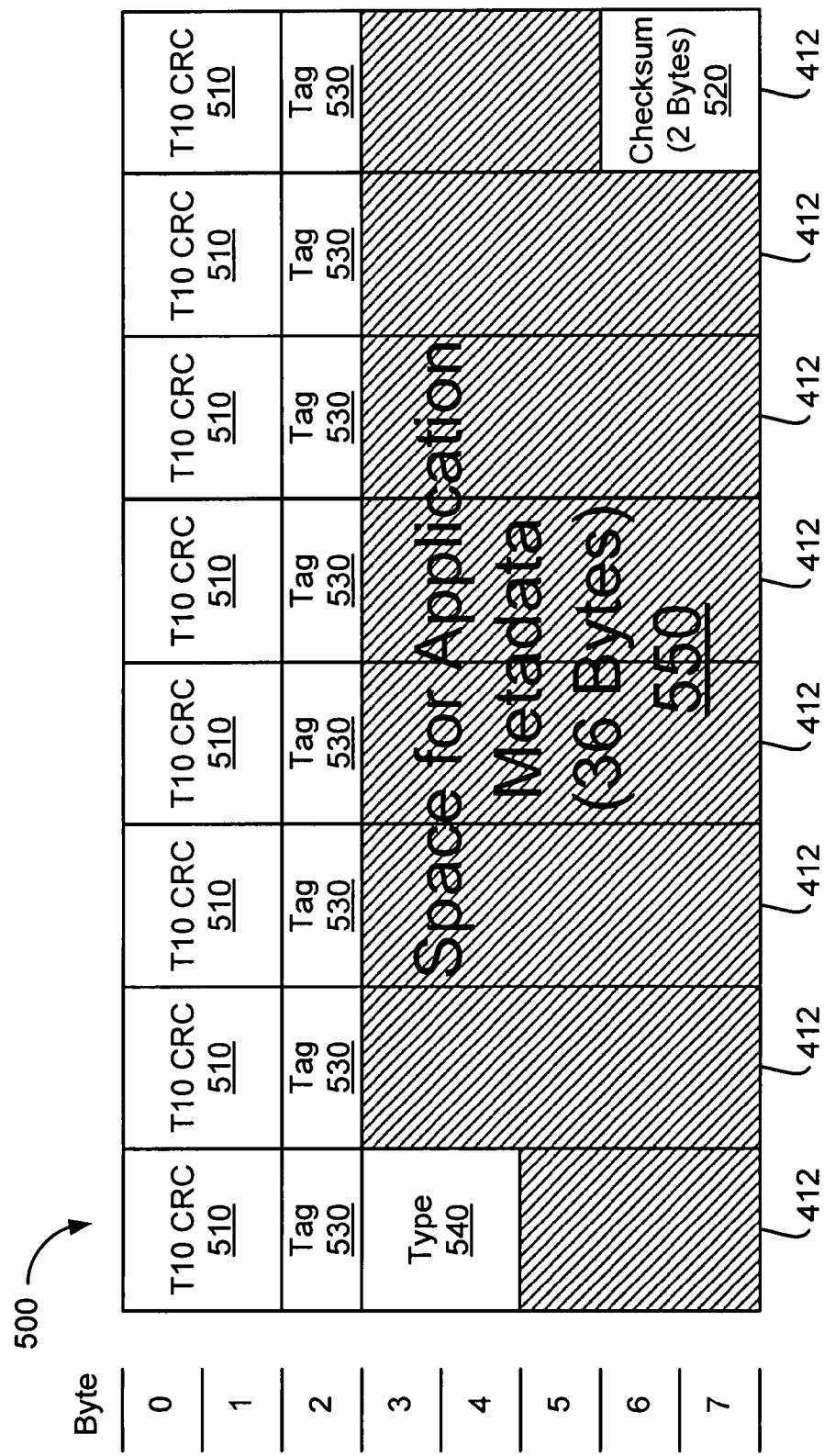
FIG. 5 is a schematic diagram illustrating an example data structure for a confluence of footers for providing high performance block storage metadata in accordance with the preferred embodiments of the present invention.

FIG. 5 is a schematic diagram illustrating an example data structure 500 for a confluence of footers for providing high performance block storage metadata in accordance with the preferred embodiments of the present invention. The data structure 500 shown in FIG. 5 illustrates a first type of HPBS metadata unit. A second type of HPBS metadata unit is described below with reference to data structure 600 shown in FIG. 6. Either the data structure 500 shown in FIG. 5 or the data structure 600 shown in FIG. 6 may correspond to the HPBS metadata unit 450 shown in FIG. 4. One skilled in the art will appreciate, however, that alternative data structures may be used in accordance with the preferred embodiments of the present invention.

A checksum is contained in a Checksum field in the data structure 500 shown in FIG. 5 (i.e., a Checksum field 520, discussed below) and in the data structure 600 shown in FIG. 6 (i.e., a Checksum field 620, discussed below). It is important to note that as utilized herein, including in the claims, the term "checksum" is intended to encompass any type of hash function, including a cyclic redundancy code (CRC).

The HPBS metadata unit 500 retains the T10 CRC. That is, each footer 412 in the confluence of footers that make up the HPBS metadata unit 500 includes a two-byte T10 CRC field 510. Preferably, the T10 CRC field 510 occupies bytes 0 and 1 in each footer 412 of the HPBS metadata unit 500. Because the T10 CRC fields 510 cover the data blocks 410 (shown in FIG. 4), a two-byte Checksum field 520 preferably covers just the footers 412 (including the T10 CRC fields 510). Preferably, the Checksum field 520 occupies bytes 6 and 7 in the last footer 412 of the HPBS metadata unit 500. As noted above, the Checksum field 520 contains a checksum that is calculated using any suitable hash function, including a CRC. In addition, a Tag field 530 is included in each footer 412 of the HPBS metadata unit 500. The Tag field 530, which is described below with reference to FIG. 7, preferably is one byte and occupies byte 2 in each footer 412 of the HPBS metadata unit 500. Also, a Type field 540 is included in at least one of the footers 412 of the HPBS metadata unit 500. The Type field 540 specifies a metadata type number, which defines application metadata 550. For example, each software and/or hardware company may have its own metadata type number. Allocation of the metadata type numbers may be administered, for example, by an appropriate standards body. Preferably, the Type field 540 is two bytes and occupies bytes 3 and 4 in the first footer 412 of the HPBS metadata unit 500. The HPBS metadata unit 500, therefore, has 36 bytes of space available (shown as a hatched area in FIG. 5) for application metadata 550, described below with reference to FIG. 8.

Figure 6:
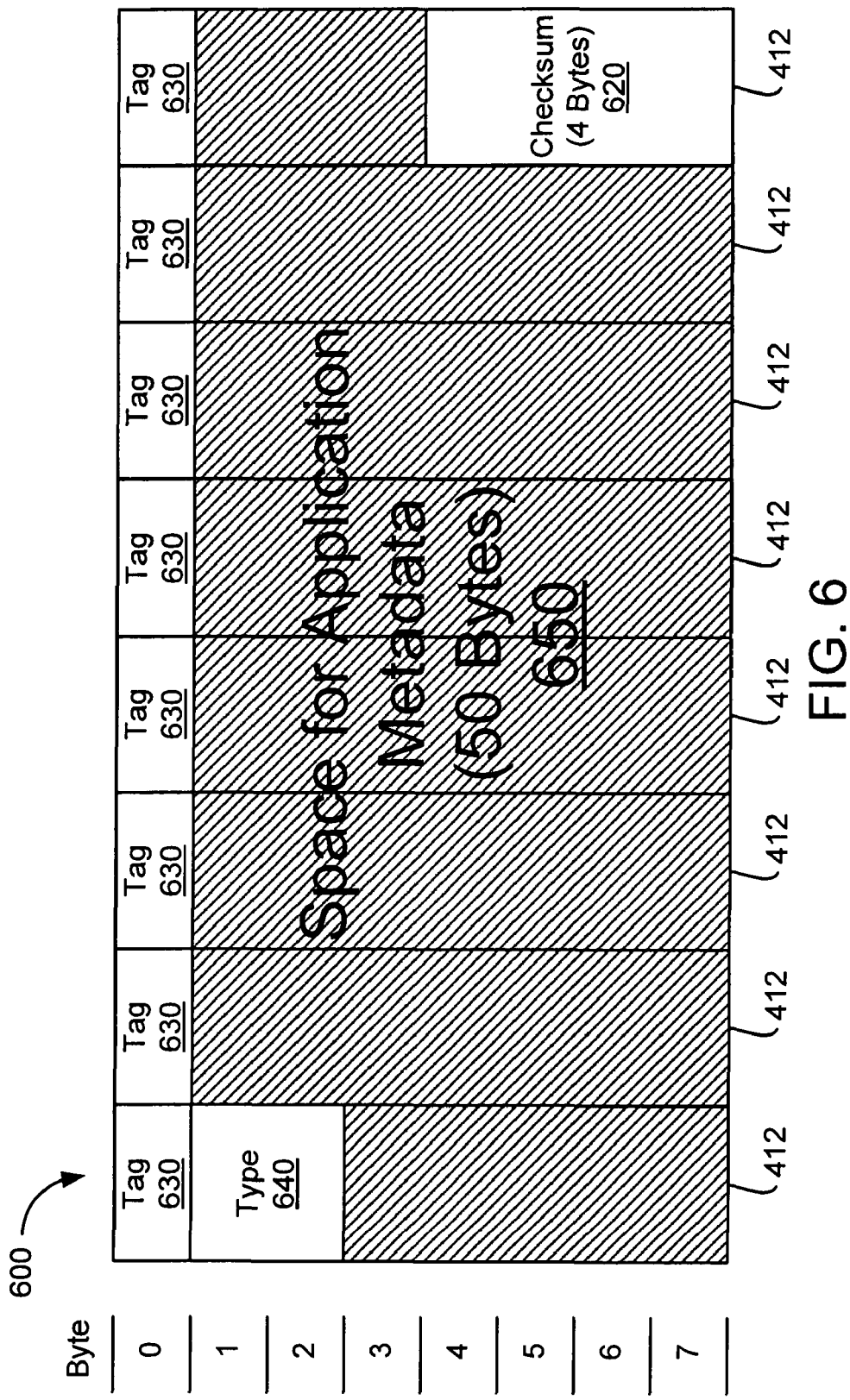
FIG. 6 is a schematic diagram illustrating another example data structure for a confluence of footers for providing high performance block storage metadata in accordance with the preferred embodiments of the present invention.

FIG. 6 is a schematic diagram illustrating another example data structure 600 for a confluence of footers for providing high performance block storage metadata in accordance with the preferred embodiments of the present invention. As noted above, the data structure 600 shown in FIG. 6 illustrates a second type of HPBS metadata unit.

The HPBS metadata unit 600 does not retain the T10 CRC. That is, each footer 412 in the confluence of footers that make up the HPBS metadata unit 600 eliminates the two-byte T10 CRC field 510 shown in FIG. 5. Because the T10 CRC fields are eliminated, a four-byte Checksum field 620 preferably covers all the data blocks 410 (shown in FIG. 4) and the footers 412 within the page 400. Preferably, the Checksum field 620 occupies bytes 4-7 in the last footer 412 of the HPBS metadata unit 600. As noted above, the Checksum field 620 contains a checksum that is calculated using any suitable hash function, including a CRC. In addition, a Tag field 630 is included in each footer 412 of the HPBS metadata unit 600. The Tag field 630, which is described below with reference to FIG. 7, preferably is one byte and occupies byte 0 in each footer 412 of the HPBS metadata unit 600. Also, a Type field 640 is included in at least one of the footers 412 of the HPBS metadata unit 600. The Type field 640 specifies a metadata type number, which defines application metadata 650. For example, each software and/or hardware company may have its own metadata type number. Allocation of the metadata type numbers may be administered, for example, by an appropriate standards body. Preferably, the Type field 640 is two bytes and occupies bytes 1 and 2 in the first footer 412 of the HPBS metadata unit 600. The HPBS metadata unit 600, therefore, has 50 bytes of space available (shown as a hatched area in FIG. 6) for application metadata 650.

Figure 7:
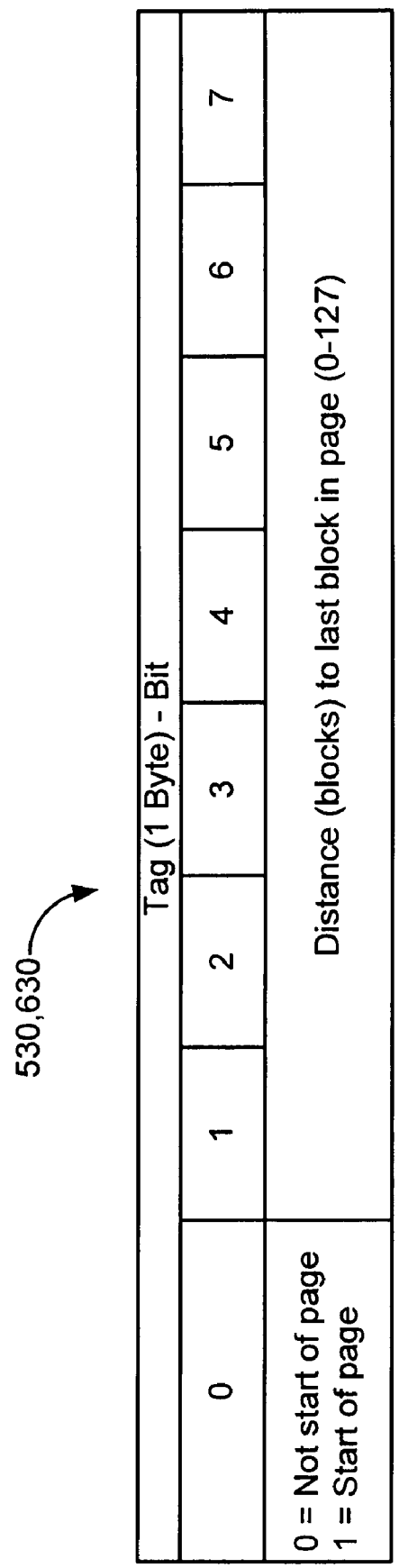
FIG. 7 is a schematic diagram illustrating an example data structure for a Tag field in accordance with the preferred embodiments of the present invention.

FIG. 7 is a schematic diagram illustrating an example data structure for a Tag field, such as Tag field 530 (shown in FIG. 5) and Tag field 630 (shown in FIG. 6), in accordance with the preferred embodiments of the present invention. As mentioned above, the Tag field 530,630 is preferably one byte. In accordance with the preferred embodiments of the present invention, bit0 of the Tag field 530,630 contains a value that indicates whether or not the Tag field 530,630 is associated with the first fixed-size block of the page. For example, if bit0 of the Tag field 530,630 contains a "zero" value then the Tag field 530,630 is not the start of the page, or if bit0 of the Tag field 530,630 contains a "one" value then the Tag field 530, 630 is the start of the page. Also, in accordance with the preferred embodiments of the present invention, bit1 through bit7 of the Tag field 530,630 contains a value that indicates the distance (expressed in blocks) to the last block in the page. Because the page preferably contains anywhere from 1 to 128 fixed-size blocks, bit1 through bit7 of the Tag field 530,630 will contain a value ranging from 0 to 127.

Figure 8:
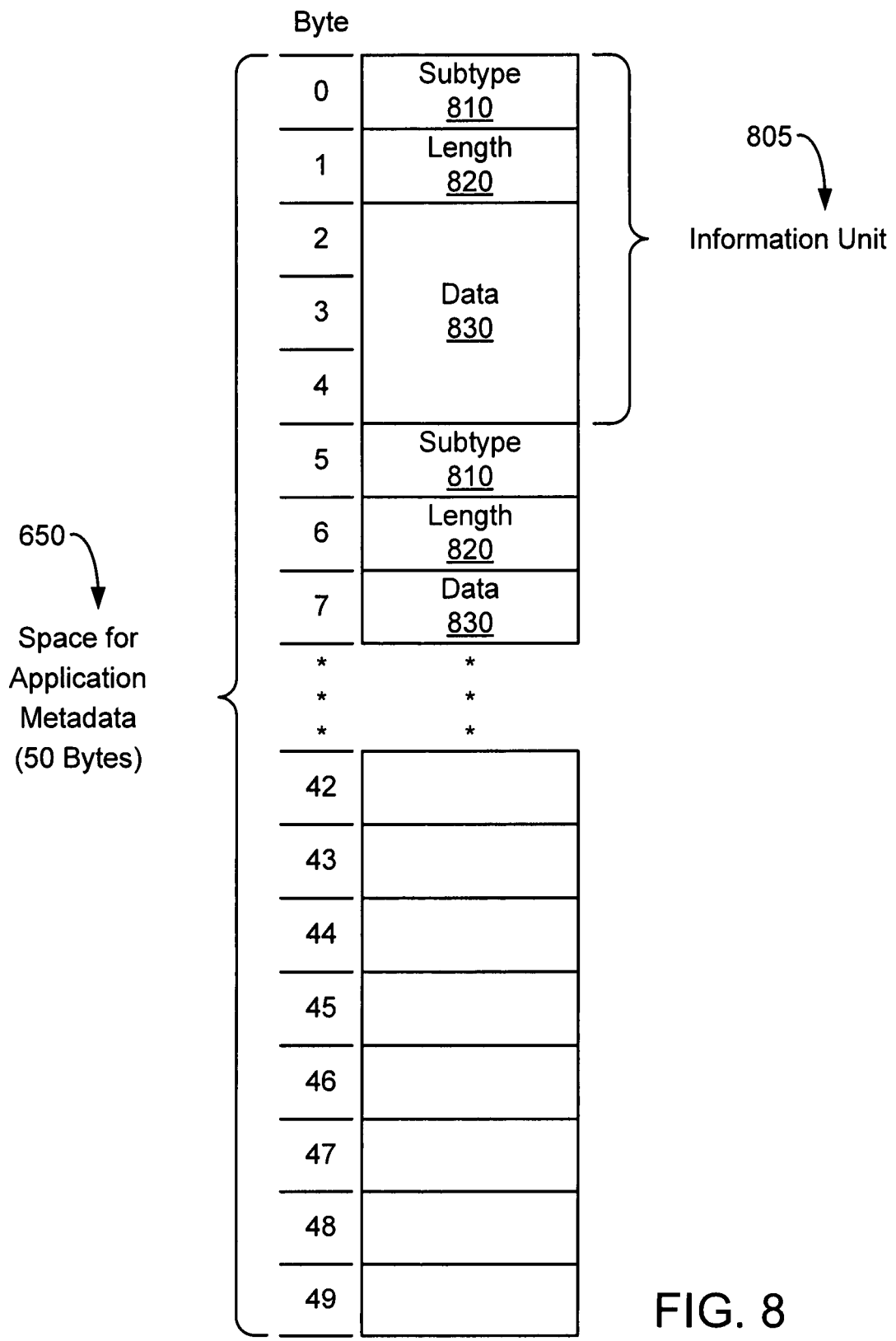
FIG. 8 is a schematic diagram illustrating an example data structure for application metadata containing a plurality of information units in accordance with the preferred embodiments of the present invention.

FIG. 8 is a schematic diagram illustrating an example data structure for application metadata, such as the application metadata 550 (shown in FIG. 5) and application metadata 650 (shown in FIG. 6), containing one or more information units in accordance with the preferred embodiments of the present invention. At fifty bytes, the space available for application metadata 650 shown in FIG. 8 corresponds to the space available shown in FIG. 6. The data structure of the application metadata contained in the space 650 includes a series of one or more contiguous variable-sized Information Units (IUs) 805. Each IU 805 is of variable size and consists of a subtype field 810 (1 byte), a length of data field 820 (1 byte), and a data field 830 (0 to "n" bytes). Preferably, the subtypes values contained in the subtype field 810 are specific to the type value contained in the type field 540,640 (shown in FIGS. 5 and 6, respectively) so that the same subtype value may have different meanings for different type values. For example, the type value may designate a software and/or hardware vendor, and the subtype value may designate the subtype may designate one or more platforms of the software and/or hardware vendor. This data structure provides a very flexible architecture for organizing a series of IUs associated with the page. The data structure of the application metadata contained in the thirty-six byte space 550 (shown in FIG. 5) is identical to the IUs 805 contained in the fifty byte space 650 shown in FIG. 8.

Figure 9:
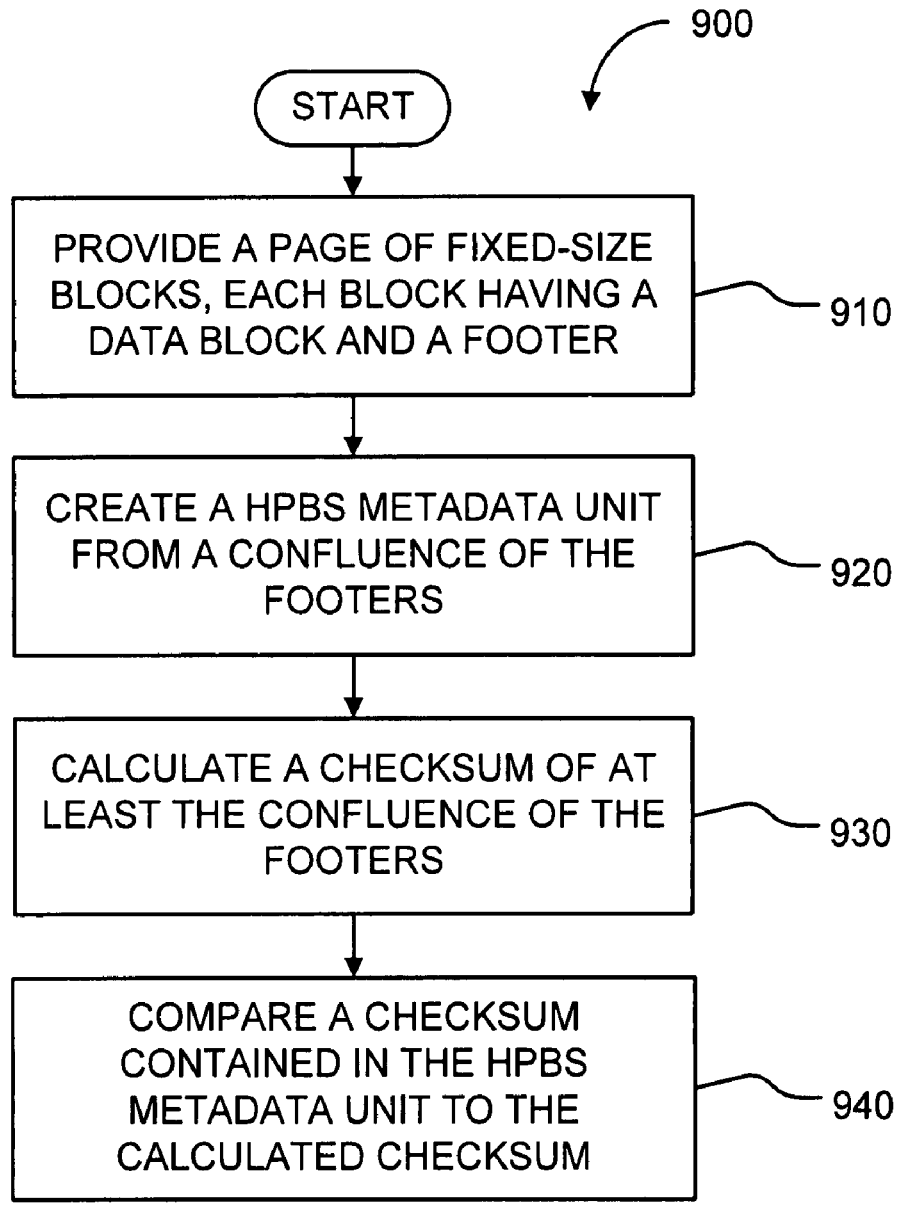
FIG. 9 is a flow diagram illustrating a method for providing high performance block storage metadata in accordance with the preferred embodiments of the present invention.

FIG. 9 is a flow diagram illustrating a method 900 for providing high performance block storage metadata in accordance with the preferred embodiments of the present invention. In the method 900, the steps discussed below (steps 910-940) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 900 begins when a mechanism for providing high performance block storage metadata (e.g., in a computer system, storage system, DASD, etc.) is provided with a page of fixed-size blocks, each block having a data block and a footer (step 910). For example, the step 910 may be performed when all of the fixed-size blocks of an entire page are read or written together in one operation in the computer system 300 (shown in FIG. 3), in the DASD 340 (shown in FIG. 3), and/or in the storage system 362 (shown in FIG. 3). The step 910 may also be performed when each data block is extended with a footer to create a page in accordance with the preferred embodiments of the present invention, e.g., by the mechanism for providing high performance block storage metadata 320 (shown in FIG. 3).

The method 900 continues by creating a high performance block storage (HPBS) metadata unit from a confluence of the footers (step 920). The step 920 may be performed by a mechanism for providing high performance block storage metadata in the computer system 300 (shown in FIG. 3), in the DASD 340 (shown in FIG. 3), and/or in the storage system 362 (shown in FIG. 3).

Next, the method 900 continues by calculating an appropriate checksum (step 930). For example, if the T10 CRC fields 510 have been retained in the HPBS metadata unit (as in the HPBS metadata unit 500 shown in FIG. 5), the checksum is calculated to cover just the confluence of footers is calculated. On the other hand, if the T10 CRC fields have not been retained in the HPBS metadata unit (as in the HPBS metadata unit 600 shown in FIG. 6), the checksum is calculated to cover all data and footers within the page. In either case, the checksum may be calculated using any suitable hash function, including a CRC. The step 930 may be performed by, for example, a mechanism for providing high performance block storage metadata in the computer system 300 (shown in FIG. 3), in the DASD 340 (shown in FIG. 3), and/or in the storage system 362 (shown in FIG. 3).

Then, the method 900 continues by comparing the checksum calculated in the step 930 to the checksum contained in the Checksum field of HPBS metadata unit (step 940). For example, if the T10 CRC fields 510 have been retained in the HPBS meta data unit (as in the HPBS metadata unit 500 shown in FIG. 5), the checksum calculated in the step 930 is compared to the checksum contained in the HPBS metadata unit's Checksum field (such as the Checksum field 520 shown in FIG. 5) which covers just the confluence of footers. On the other hand, if the T10 CRC fields have not been retained in the HPBS metadata unit (as in the HPBS metadata unit 600 shown in FIG. 6), the checksum calculated in step 930 is compared to a checksum contained in the HPBS metadata unit's Checksum field (such as the Checksum field 620 shown in FIG. 6) that covers all data and footers within the page. The step 940 may be performed by, for example, a mechanism for providing high performance block storage metadata in the computer system 300 (shown in FIG. 3), in the DASD 340 (shown in FIG. 3), and/or in the storage system 362 (shown in FIG. 3).

If the comparison performed in step 940 indicates the existence of corrupt data in the confluence of footers (in the case of the HPBS metadata unit 500 shown in FIG. 5) or somewhere in all of the data and footer within the page (in the case of the HPBS metadata unit 600 shown in FIG. 6), the mechanism for providing high performance block storage metadata in accordance with the preferred embodiments of the present invention causes the system or device (e.g., a computer system, storage system, DASD, etc.) to reject the read/write operation involving the corrupt data and/or to report the existence of corrupt data. This protects correct data in the system or device from being adversely impacted by the corrupt data during and/or subsequent to the read/write operation, and prevents the read/write operation from appearing to complete successfully. During a write operation in a DASD, for example, when the comparison performed in step 940 indicates the existence of corrupt data, the write request from the host system is rejected, the corrupt data is prevented from being written to the media, and a "corrupt data" error signal is returned to the host system.

Figure 10:
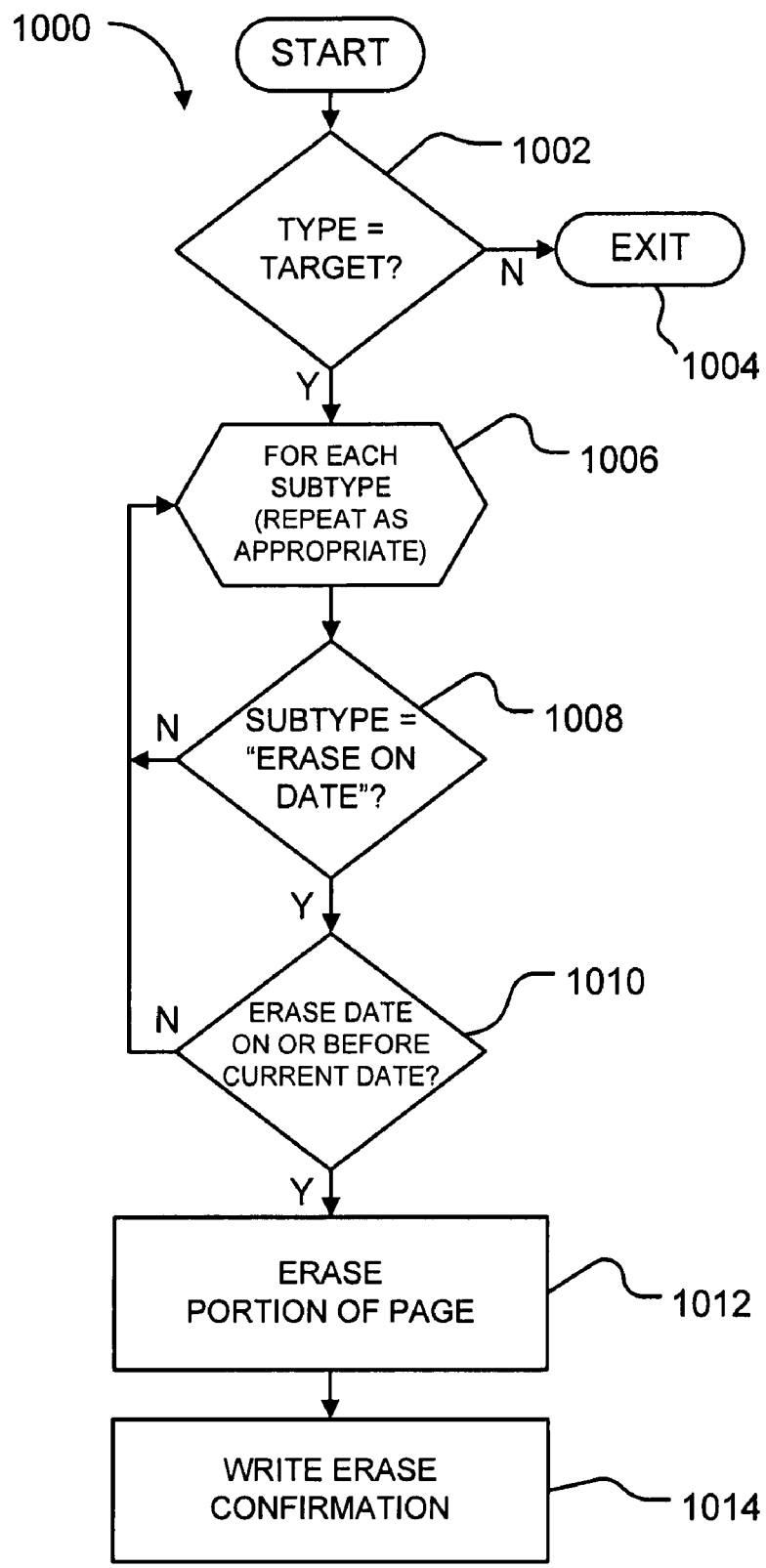
FIG. 10 is a flow diagram illustrating a method for utilizing high performance block storage metadata in accordance with the preferred embodiments of the present invention.

FIG. 10 is a flow diagram illustrating a method 1000 for utilizing high performance block storage metadata in accordance with the preferred embodiments of the present invention. The method 1000 is an "erase on date" application that may be used for managing data life cycle—data in an associated page should be deleted on the specified date. In the method 1000, the steps discussed below (steps 1002-1014) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 1000 begins with a mechanism for utilizing high performance block storage metadata (e.g., in a computer system, storage system, DASD, etc.) determining whether a Type field (e.g., the Type field 540,640 shown in FIGS. 5 and 6, respectively) in a HPBS metadata unit contains a target metadata type number (step 1002). The target metadata type number may be, for example, a metadata type number that was assigned to a particular software and/or hardware vendor by an appropriate standards body.

If the Type field does not contain the target metadata type number (step 1002=no), the method 1000 exits (step 1004). On the other hand, if the Type field contains the target metadata type number (step 1002=yes), the method 1000 continues with the utilizing mechanism, for each Subtype field (e.g., the Subtype field 810 in each of the Information Units (IUs) shown in FIG. 8) in the HPBS metadata unit (step 1006), determining whether the Subtype field contains an "erase on date" value (step 1008).

If the Subtype field does not contain the "erase on date" value (step 1008 no), the method 1000 returns to step 1006. Step 1006 repeats step 1008 for each Subtype field in the HPBS metadata unit. Preferably, the method 1000 is repeated on a periodic basis and/or on an availability basis. For example, it may be desirable to repeat method 1000 nightly (e.g., after office hours) when greater bandwidth is typically available on a computer system and/or storage system. If the Subtype field contains the "erase on date" value (step 1008=yes), the method 1000 continues with the utilization mechanism determining whether an "erase date" in the HPBS metadata unit is on or before the "current date" (step 1010). As described in more detail below with reference to FIG. 12, in accordance with the preferred embodiments of the present invention the "erase date" is contained in an erase date field (e.g., the first byte of a 3-byte data field) of the IU having the Subtype field that contains the "erase on date" value. Preferably, the "erase date" is a date and time at or after which erasure of at least a portion of the page (i.e., the page with which the HPBS metadata unit is associated) is to occur. The "current date" is preferably the present date and time from the clock of the computer system, storage system, DASD, etc.

If the "erase date" in the HPBS metadata unit is not on or before the "current date" (i.e., the "erase date" is after the "current date") (step 1010=no), the method 1000 returns to step 1006. On the other hand, if the "erase date" in the HPBS metadata unit is on or before the "current date" (step 1010=yes), the method 1000 continues with the utilization mechanism causing an erase operation to occur with respect to at least a portion of the page with which the HPBS metadata unit is associated (step 1012). The erase operation may use any conventional technique such as a simple overwrite. For example, the utilization mechanism may cause the entire page (i.e., both the data blocks and the footers) to be overwritten, or may cause certain portions of the page to be overwritten while retaining one or more other portions of the page. It may be desirable to retain portions of the page for auditing purposes, for example. As discussed in more detail below, an erase confirmation may be written into these remaining portions of the page so as to enable determination of whether or not the erase operation completed, when it was completed, etc.

In accordance with the preferred embodiments of the present invention, the method 1000 continues with the utilization mechanism causing an erase confirmation to be written (step 1014). The utilization mechanism may, for example, cause an "erase status" value in the HPBS metadata unit to be changed and/or cause a "date erase completed" value to be written into the HPBS metadata unit. As described in more detail below with reference to FIG. 12, in accordance with the preferred embodiments of the present invention the "erase status" value and the "date erase completed" value are respectively contained in an "erase status" field and a "date erase completed" field of the IU having the Subtype field that contains the "erase on date" value. Preferably, the "erase status" value indicates a status of the page with respect to the erasure operation, e.g., not yet erased, erased successfully, erase attempted with error, etc. The "date erase completed" value preferably indicates a date and time at which the erase operation completed successfully.

Figure 11:
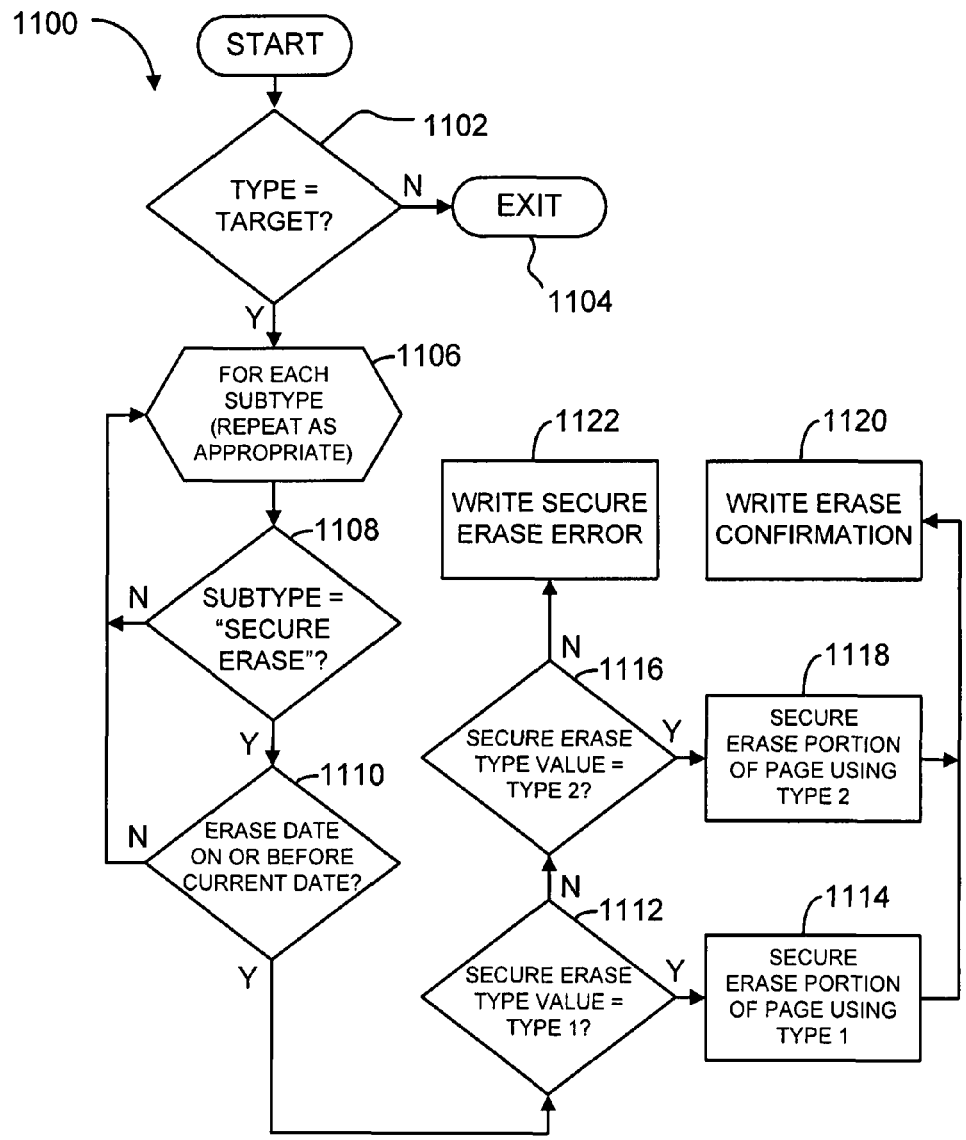
FIG. 11 is a flow diagram illustrating another method for utilizing high performance block storage metadata in accordance with the preferred embodiments of the present invention.

FIG. 11 is a flow diagram illustrating another method 1100 for utilizing high performance block storage metadata in accordance with the preferred embodiments of the present invention. The method 1100 is a "secure erase" application that may be used for providing data security and managing data life cycle—data in an associated page should be securely deleted on the specified date or immediately. The method 1100 uses a secure erase technique, preferably selectable among a plurality of secure erase types. A secure erase is different than deleting the data with a simple overwrite. Various secure erase types ensure that information once erased cannot readily be recovered. Secure erase types include overwriting with 3 passes: with a character, then its complement, and finally with a random character; overwriting with 7 passes; and the Gutmann method. In the method 1100, the steps discussed below (steps 1102-1122) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 1100 begins with a mechanism for utilizing high performance block storage metadata (e.g., in a computer system, storage system, DASD, etc.) determining whether a Type field (e.g., the Type field 540,640 shown in FIGS. 5 and 6, respectively) in a HPBS metadata unit contains a target metadata type number (step 1102). The target metadata type number may be, for example, a metadata type number that was assigned to a particular software and/or hardware vendor by an appropriate standards body.

If the Type field does not contain the target metadata type number (step 1102=no), the method 1100 exits (step 1104). On the other hand, if the Type field contains the target metadata type number (step 1102=yes), the method 1100 continues with the utilizing mechanism, for each Subtype field (e.g., the Subtype field 810 in each of the Information Units (IUs) shown in FIG. 8) in the HPBS metadata unit (step 1106), determining whether the Subtype field contains a "secure erase" value (step 1108).

If the Subtype field does not contain the "secure erase" value (step 1108 no), the method 1100 returns to step 1106. Step 1106 repeats step 1108 for each Subtype field in the HPBS metadata unit. Preferably, the method 1100 is repeated on a periodic basis and/or on an availability basis. For example, it may be desirable to repeat method 1100 nightly (e.g., after office hours) when greater bandwidth is typically available on a computer system and/or storage system. If the Subtype field contains the "secure erase" value (step 1108=yes), the method 1100 continues with the utilization mechanism determining whether an "erase date" in the HPBS metadata unit is on or before the "current date" (step 1110). As described in more detail below with reference to FIG. 13, in accordance with the preferred embodiments of the present invention the "erase date" is contained in an erase date field of the IU having the Subtype field that contains the "secure erase" value. Preferably, the "erase date" is a date and time at or after which at least a portion of the page (i.e., the page with which the HPBS metadata unit is associated) is to be securely erased. Secure erase is used so that information from that portion of the page cannot readily be recovered (e.g., using forensic software that can make data that have been erased forensically recoverable through "data remanence", i.e., a residual physical representation of the data that have been erased). The "current date" is preferably the present date and time from the clock of the computer system, storage system, DASD, etc.

If the "erase date" in the HPBS metadata unit is not on or before the "current date" (i.e., the "erase date" is after the "current date") (step 1110=no), the method 1100 returns to step 1106. On the other hand, if the "erase date" in the HPBS metadata unit is on or before the "current date" (step 1110=yes), the method 1100 continues with the utilization mechanism determining whether a "secure erase type" value in the HPBS metadata unit is type 1 (e.g., overwriting with 3 passes: with a character, then its complement, and finally with a random character) (step 1112). As described in more detail below with reference to FIG. 13, in accordance with the preferred embodiments of the present invention the "secure erase type" value is contained in a "secure erase type" field of the IU having the Subtype field that contains the "secure erase" value.

If the "secure erase type" value in the HPBS metadata unit is type 1 (step 1112=yes), the method 1100 continues with the utilization mechanism causing the secure erase type 1 operation to occur with respect to at least a portion of the page with which the HPBS metadata unit is associated (step 1114). The secure erase type 1 operation may use any conventional secure erase technique. For example, the utilization mechanism may cause the entire page (i.e., both the data blocks and the footers) to be securely erased, or may cause certain portions of the page to be securely erased while retaining one or more other portions of the page. It may be desirable to retain portions of the page for auditing purposes, for example. As discussed in more detail below, an erase confirmation may be written into these remaining portions of the page so as to enable determination of whether or not the secure erase operation completed, when it was completed, etc.

In accordance with the preferred embodiments of the present invention, the method 1100 continues with the utilization mechanism causing an erase confirmation to be written (step 1120). The utilization mechanism may, for example, cause an "erase status" value in the HPBS metadata unit to be changed and/or cause a "date erase completed" value to be written into the HPBS metadata unit. As described in more detail below with reference to FIG. 13, in accordance with the preferred embodiments of the present invention the "erase status" value and the "date erase completed" value are respectively contained in an "erase status" field and a "date erase completed" field of the IU having the Subtype field that contains the "secure erase" value. Preferably, the "erase status" value indicates a status of the page with respect to the erasure operation, e.g., not yet erased, erased successfully, erase attempted with error, etc. The "date erase completed" value preferably indicates a date and time at which the erase operation completed successfully.

On the other hand, if the "secure erase type" value in the HPBS metadata unit is not type 1 (step 1112=no), the method 1100 continues with the utilization mechanism determining whether a "secure erase type" value in the HPBS metadata unit is type 2 (e.g., overwriting with 7 passes) (step 1116). If the "secure erase type" value in the HPBS metadata unit is type 2 (step 1116=yes), the method 1100 continues with the utilization mechanism causing the secure erase type 2 operation to occur with respect to at least a portion of the page with which the HPBS metadata unit is associated (step 1118). The step 1118 is analogous to the step 1114 except that in step 1118 the secure erase type 2 operation is used in lieu of the secure erase type 1 operation of step 1114. The secure erase type 2 operation may use any conventional secure erase technique.

If the "secure erase type" value in the HPBS metadata unit is not type 2 (step 1116=no), the method 1100 continues with the utilization mechanism causing a secure erase error to be written. The utilization mechanism may, for example, cause the "erase status" value in the HPBS metadata unit to be changed to a value indicative of "erase attempted with error".

One skilled in the art will appreciate that the method 1100 shown in FIG. 11 may be modified to allow the use of any number of secure erase types in lieu of two.

FIG. 12 is a schematic diagram illustrating an example data structure for an information unit 1200 for use with an "erase on date" application (e.g., method 1000 shown in FIG. 10) in accordance with the preferred embodiments of the present invention. The information unit 1200 corresponds with one of the IUs 805 shown in FIG. 8. The information unit 1200 includes a subtype field 1210 (e.g., 1 byte) having an "erase on date" value, a length of data field 1220 (e.g., 1 byte), and a data field 1230 (e.g., 17 bytes). The data field 1230 includes an "erase date" field 1232 (e.g., 8 bytes), an "erase status field" 1234 (e.g., 1 byte), and a "date erase completed" field 1236 (e.g., 8 bytes).

FIG. 13 is a block diagram illustrating an example data structure for an information unit 1300 for use with a "secure erase" application (e.g., method 1100 shown in FIG. 11) in accordance with the preferred embodiments of the present invention. The information unit 1300 corresponds with one of the IUs 805 shown in FIG. 8. The information unit 1300 includes a subtype field 1310 (e.g., 1 byte) having a "secure erase" value, a length of data field 1320 (e.g., 1 byte), and a data field 1330 (e.g., 18 bytes). The data field 1330 includes an "erase date" field 1332 (e.g., 8 bytes), an "erase status field" 1334 (e.g., 1 byte), a "date erase completed" field 1336 (e.g., 8 bytes), and a "secure erase type" field 1338 (e.g., 1 byte).

One skilled in the art will appreciate that many variations are possible within the scope of the present invention. For example, the mechanism for utilizing high performance block storage metadata in accordance with the preferred embodiments of the present invention may be used within the context of other applications within the scope of the present invention. In a first illustrative example, a "Timestamp" application may be used for providing a diagnostics aid—the date/time of write is stored as application metadata in the HPBS metadata unit. This indicates when the data in the page was last written, and also serves as an audit trail (e.g., to prove that the data was not changed later).

In a second illustrative example, a "LBA" (Logical Block Address) application may be used for data integrity protection—the SCSI block address where the page is stored as application metadata in the HPBS metadata unit. This ensures that the page is stored in the correct location on disk.

In a third illustrative example, an "Owning Application ID" application may be used for providing a diagnostics aid—a unique identifier of the application that created the data in the page is stored as application metadata in the HPBS metadata unit. This can also be used for security access control purposes.

In a fourth illustrative example, a "Write Protect" application may be used for security, audit tracks, and to prevent malicious change/deletion of data—application metadata stored in the HPBS metadata unit prevent overwriting the page.

In a fifth illustrative example, an "Access Control List" may be used for security and privacy—application metadata stored in the HPBS metadata unit specify the application IDs that have authority to read from or write to the page.

In a sixth illustrative example, a "Performance Requirements" application may be used to improve performance and lower cost—application metadata stored in the HPBS metadata unit specify the level of performance required for the page. This can also be used for hierarchical storage enablement.

In a seventh illustrative example, a "Cache Hints" application may be used for improved performance through efficient cache utilization—application metadata stored in the HPBS metadata unit indicate whether the page should be kept in read cache.

In an eighth illustrative example, an "Integration Verification Timestamp" may be used for diagnostics and data integrity—the date/time when data integrity was verified by validating the checksum is stored as application metadata in the HPBS metadata unit.

Thus, while the present invention has been particularly shown and described with reference to preferred embodiments thereof, it will be understood by those skilled in the art that these and other changes in form and details may be made therein without departing from the spirit and scope of the present invention.

What is cliamed is:

1. A computer-implemented method for providing high performance block storage metadata, comprising the steps of:
providing a stream of data comprising a sequence of fixed-size blocks that together define a page, each of the fixed-size blocks comprising a data block and a footer;
creating a high performance block storage metadata unit from a confluence of the footers, wherein the high performance block storage metadata unit is associated with the page, and wherein the confluence of footers includes one or more information units each spanning across at least two the footers in the confluence of footers from one of the footers to another of the footers.

2. The computer-implemented method as recited in claim 1, wherein the high performance block storage metadata unit includes a Checksum field containing a checksum that covers at least the confluence of the footers.

3. The computer-implemented method as recited in claim 1, further comprising the steps of:
calculating a checksum of at least the confluence of the footers;
comparing the checksum contained in the Checksum field to the checksum calculated in the calculating step.

4. A data processing system, comprising:
a processor;
a memory coupled to the processor, the memory encoded with instructions that when executed by the processor comprise the steps of:
providing a stream of data comprising a sequence of fixed-size blocks that together define a page, each of the fixed-size blocks comprising a data block and a footer;
creating a high performance block storage metadata unit from a confluence of the footers, wherein the high performance block storage metadata unit is associated with the page, and wherein the confluence of footers includes one or more information units each spanning across at least two the footers in the confluence of footers from one of the footers to another of the footers.

5. The data processing system as recited in claim 4, further comprising:
a server system that includes the processor and the memory, and wherein each data block associated with each of the fixed-size blocks is written in a separate physical area of the memory than the footer associated therewith.

6. The data processing system as recited in claim 4, further comprising:
a storage system that includes the processor and the memory, and
wherein each data block associated with each of the fixed-size blocks is written in a same physical area of the memory as the footer associated therewith.

7. The data processing system as recited in claim 4, further comprising:
a server system;
a storage system, and
wherein the server system and the storage system are configured to enable communication therebetween,
wherein the server system and the storage system each include an occurrence of the processor and the memory,
wherein each data block associated with each of the fixed-size blocks is written in a separate physical area of the memory of the server system than the footer associated therewith, and
wherein each data block associated with each of the fixed-size blocks is written in a same physical area of the memory of the storage system as the footer associated therewith.

8. A computer program product for providing high performance block storage metadata in a digital computing device having at least one processor, comprising:
a plurality of executable instructions provided on a computer readable recordable media, wherein the executable instructions, when executed by the at least one processor, cause the digital computing device to perform the steps of:
providing a stream of data comprising a sequence of fixed-size blocks that together define a page, each of the fixed-size blocks comprising a data block and a footer;
creating a high performance block storage metadata unit from a confluence of the footers, wherein the high performance block storage metadata unit is associated with the page, and wherein the confluence of footers includes one or more information units each spanning across at least two the footers in the confluence of footers from one of the footers to another of the footers.

9. The computer program product as recited in claim 8, wherein the digital computing device is at least one of a server system and a storage system.

10. The computer program product as recited in claim 8, wherein the digital computing device is a storage system, and wherein the storage system acts autonomously on the page according to instructions encoded in the high performance block storage metadata unit.

11. A data structure for providing high performance block storage metadata, wherein a plurality of footers are stored on a computer readable recordable media, the data structure comprising:
a page defined by a sequence of fixed-size blocks, each of the fixed-size blocks comprising a data block and a footer, and
wherein a confluence of the footers defines a high performance block storage metadata unit associated with the page,
wherein each footer in the confluence of footers includes a Tag field,
wherein at least one of the footers in the confluence of footers includes a Type field,
wherein at least one of the footers in the confluence of footers includes a Checksum field containing a checksum that covers at least the confluence of footers, and
wherein each footer in the confluence of footers includes space for application metadata.

12. The data structure as recited in claim 11, wherein the data blocks are 512 bytes and the footers are eight bytes.

13. The data structure as recited in claim 11, wherein each data block associated with each of the fixed-size blocks is stored in a same physical area of the computer readable recordable media as the footer associated therewith.

14. The data structure as recited in claim 11, wherein each footer in the confluence of footers includes a CRC field that covers the data block associated therewith, wherein the first footer in the confluence of footers includes the Type field, and wherein the last footer in the confluence of footers includes the Checksum field.

15. The data structure as recited in claim 14, wherein each of the CRC fields is two bytes, each of the Tag fields is one byte, the Type field is two bytes, and the Checksum field is two bytes.

16. The data structure as recited in claim 15, wherein the page is defined by a sequence of eight fixed-size blocks, and the space for application metadata in the confluence of footers totals thirty six bytes.

17. The data structure as recited in claim 11, wherein the first footer in the confluence of footers includes the Type field, and wherein the last footer in the confluence of footers includes a Checksum field that covers the data blocks and the confluence of footers.

18. The data structure as recited in claim 17, wherein each of the Tag fields is one byte, the Type field is two bytes, and the Checksum field is four bytes.

19. The data structure as recited in claim 18, wherein the page is defined by a sequence of eight fixed-size blocks, and the space for application metadata in the confluence of footers totals fifty bytes.

20. The data structure as recited in claim 11, wherein each of the Tag fields is one byte, wherein bit0 in each of the Tag fields indicates whether or not the footer is the first footer, and wherein bit1 to bit7 in each of the Tag fields indicate the number of fixed-size blocks to the last fixed-size block in the page.

21. The data structure as recited in claim 11, wherein the space for application metadata in the confluence of footers includes one or more information units each comprising a subtype field, a length field, and a data field.

22. The data structure as recited in claim 11, wherein the space for application metadata in the confluence of footers includes one or more information units each comprising a subtype field, a length field, and a data field, and wherein at least one of these information units spans across at least two of the footers in the confluence of footers from one of the footers to another of the footers.

23. A computer-implemented method for utilizing high performance block storage metadata, wherein a sequence of fixed-size blocks define a page, and wherein each of the fixed-size blocks includes a data block and a footer, the computer-implemented method comprising the steps of:
comparing a current date and an erase date, wherein the erase date is contained in a high performance block storage metadata unit that is created from a confluence of the footers and associated with the page;
erasing at least a portion of the page if the erase date is on or before the current date.

24. The computer-implemented method as recited in claim 23, wherein the high performance block storage metadata unit contains a "secure erase type" value, and wherein the erasing step includes the steps of:
  determining the "secure erase type" value contained in the high performance block storage metadata unit;
  selecting a type of secure erase to be performed based on the "secure erase type" determined in the determining step;
  performing a secure erase of the type selected in the selecting step on at least a portion of the page;
  writing an erase confirmation into the high performance block storage metadata unit after the step of performing a secure erase has been completed.

* * * * *